US010237730B2

(12) United States Patent
Benoit et al.

(10) Patent No.: US 10,237,730 B2
(45) Date of Patent: Mar. 19, 2019

(54) METHODS AND SYSTEMS FOR ENCRYPTING COMMUNICATIONS USING A SECURE ELEMENT

(71) Applicant: NAGRAVISION S.A., Cheseaux-sur-Lausanne (CH)

(72) Inventors: Bernard Benoit, Renens (CH); Jean-Claude Fournier, Noyal-sur-Vilaine (FR); Jerome Perrine, Romanel sur Morges (CH); Laurent Gauteron, Evian (FR)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 94 days.

(21) Appl. No.: 15/151,224

(22) Filed: May 10, 2016

(65) Prior Publication Data

US 2017/0238172 A1    Aug. 17, 2017

Related U.S. Application Data

(60) Provisional application No. 62/296,188, filed on Feb. 17, 2016.

(51) Int. Cl.
*H04K 1/00* (2006.01)
*H04W 12/02* (2009.01)
(Continued)

(52) U.S. Cl.
CPC .......... *H04W 12/02* (2013.01); *G06F 21/606* (2013.01); *H04L 9/0841* (2013.01);
(Continued)

(58) Field of Classification Search
CPC ............. H04L 63/0435; H04L 63/0478; H04L 9/0841; H04L 9/0844; H04L 9/3066; H04W 12/02; H04W 12/04; G06F 21/606
(Continued)

(56) References Cited

U.S. PATENT DOCUMENTS

| 8,296,566 B2 * | 10/2012 | Fontana | G06Q 20/341 |
| | | | 380/277 |
| 2002/0004898 A1 * | 1/2002 | Droge | H04L 63/0464 |
| | | | 713/151 |
| 2003/0031320 A1 * | 2/2003 | Fan | H04L 63/04 |
| | | | 380/255 |

FOREIGN PATENT DOCUMENTS

CN    105005731 A    * 10/2015

OTHER PUBLICATIONS

Written Opinion of the International Searching Authority for PCT/EP2017/053466.

* cited by examiner

*Primary Examiner* — Samson B Lemma
(74) *Attorney, Agent, or Firm* — Oblon, McClelland, Maier & Neustadt, L.L.P.

(57) ABSTRACT

Disclosed herein are methods and systems for encrypting communications using a secure element. An embodiment takes the form of a method including the steps of performing a key-exchange procedure with an endpoint via a voice-communication device to obtain a symmetric seed key for a secure voice session with the endpoint; generating first and second symmetric session keys for the secure voice session based on the obtained symmetric seed key; receiving outbound voice packets from the voice-communication device in connection with the secure voice session, each outbound voice packet including a header and an unencrypted payload; using a first symmetric encryption algorithm and the first symmetric session key, followed by a second symmetric encryption algorithm and the second symmetric session key to generate and output twice-encrypted outbound-voice-packet payloads to the voice-communication device for transmission to the endpoint in connection with the secure voice session.

26 Claims, 11 Drawing Sheets

(51) Int. Cl.
    *H04W 12/04*     (2009.01)
    *H04L 29/06*     (2006.01)
    *H04L 9/08*     (2006.01)
    *H04L 9/30*     (2006.01)
    *H04W 12/06*     (2009.01)
    *G06F 21/60*     (2013.01)

(52) U.S. Cl.
    CPC .......... *H04L 9/0844* (2013.01); *H04L 9/3066* (2013.01); *H04L 63/0435* (2013.01); *H04L 63/0478* (2013.01); *H04W 12/04* (2013.01); *H04W 12/06* (2013.01)

(58) Field of Classification Search
    USPC ........................................................ 380/270
    See application file for complete search history.

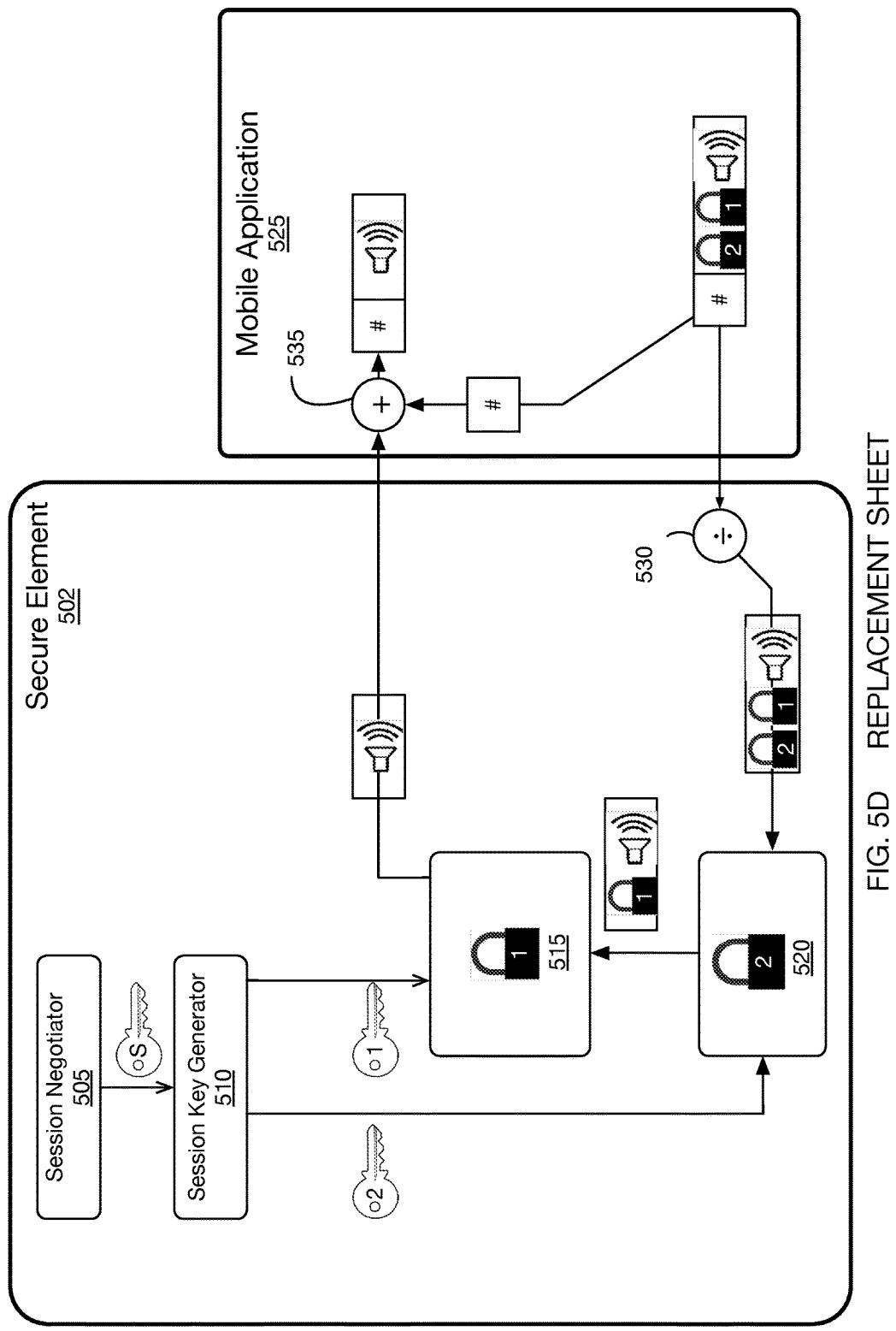
FIG. 5D   REPLACEMENT SHEET

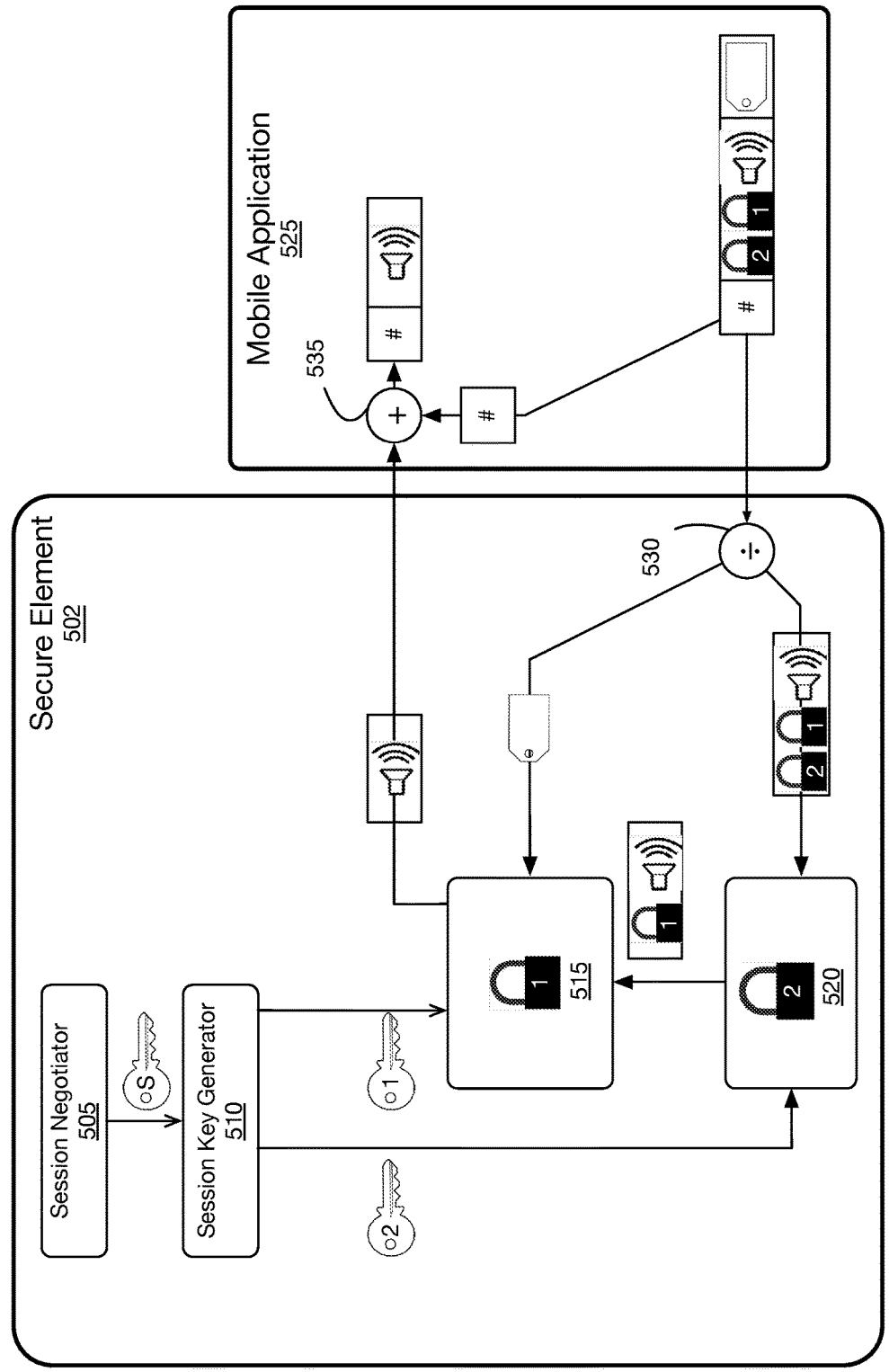
FIG. 5E  REPLACEMENT SHEET

METHODS AND SYSTEMS FOR ENCRYPTING COMMUNICATIONS USING A SECURE ELEMENT

CROSS-REFERENCE TO RELATED APPLICATIONS

This application claims the benefit of U.S. Provisional Patent Application No. 62/296,188, filed Feb. 17, 2016 and entitled "Methods and Systems for Encrypting Communications Using a Secure Element," the entire contents of which are hereby incorporated herein by reference.

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld (as may be the case for a walkie-talkie), body-mounted, or attached to a vehicle (such as the roof of a car), as examples.

Given the relative ease with which radio signals can be intercepted, communication with (or between) personal mobile devices is often encrypted to prevent interception of the communication by third parties. Generally speaking, encryption is the process of converting audible voice or other data into unintelligible data, while decryption is the process of converting the unintelligible data back to the original (e.g., audible voice). The respective algorithms used for encryption and decryption are often referred to collectively as a cipher. Examples of common ciphers include Advanced Encryption Standard (AES), Blowfish, Data Encryption Standard (DES), Triple DES, and RC4, among numerous others.

OVERVIEW OF DISCLOSED EMBODIMENTS

Described herein are methods and systems for communication-session arrangement on behalf of cryptographic endpoints.

At least one embodiment takes the form of a method that includes the steps of (i) performing a key-exchange procedure with an endpoint via the voice-communication device to obtain a symmetric seed key for a secure voice session with the endpoint; (ii) generating first and second symmetric session keys for the secure voice session based on the obtained symmetric seed key; (iii) receiving outbound voice packets from the voice-communication device in connection with the secure voice session, where each outbound voice packet includes an outbound-voice-packet header and an unencrypted outbound-voice-packet payload; (iv) using a first symmetric encryption algorithm to generate respective once-encrypted outbound-voice-packet payloads based on the first symmetric session key, the respective outbound-voice-packet headers, and the respective unencrypted outbound-voice-packet payloads; (v) using a second symmetric encryption algorithm to generate respective twice-encrypted outbound-voice-packet payloads based on the second symmetric session key and the respective once-encrypted outbound-voice-packet payloads; and (vi) outputting the respective twice-encrypted outbound-voice-packet payloads to the voice-communication device for assembly with the respective outbound-voice-packet headers for transmission to the endpoint in connection with the secure voice session.

Furthermore, it should be expressly appreciated that, while two encryption stages are described in the examples of this disclosure, any number of encryption stages (e.g., three, five, ten, etc.) could be used in various other embodiments, as deemed suitable by those of skill in the art for a given implementation. In some instances, two or three layers of private encryption (i.e., encryption using an unpublished encryption algorithm) may be combined with two or three layers of public encryption (i.e., encryption using a published encryption algorithm). And certainly numerous other possibilities could be listed here as well. Moreover, the language used herein regarding "first" and "second" keys for "first" and "second" encryption algorithms contemplates implementations that use only those "first" and "second" encryption stages, and also contemplates any one or more encryption stages being implemented after the so-called "first" encryption stage and before the so-called "second" (i.e., last) encryption stage.

In some embodiments, the secure element is a component on a printed circuit board (PCB) of the voice-communication device. In some embodiments, the secure element being communicatively coupled with the voice-communication device includes the secure element being communicatively coupled with the voice-communication device via a serial peripheral interface (SPI) connection.

In some embodiments, the secure element being communicatively coupled with the voice-communication device includes the secure element being communicatively coupled with the voice-communication device via a microSD interface.

In some embodiments, the secure element being communicatively coupled with the voice-communication device includes the secure element being communicatively coupled with the voice-communication device via a secure identity module (SIM) interface.

In some embodiments, the voice-communication device includes a smartphone.

In some embodiments, the voice-communication device includes a headset.

In some embodiments, the key-exchange procedure includes a Diffie-Hellman key-exchange procedure. In some embodiments, the Diffie-Hellman key-exchange procedure includes an elliptical-curve Diffie-Hellman key-exchange procedure.

In some embodiments, the method further includes performing an end-user-mutual-authentication procedure with the endpoint via the voice-communication device for the secure voice session. In some embodiments, the end-user-mutual-authentication procedure includes a Diffie-Hellman end-user-mutual-authentication procedure. In some embodiments, the Diffie-Hellman end-user-mutual-authentication procedure includes an elliptical-curve Diffie-Hellman end-user-mutual-authentication procedure.

In some embodiments, the endpoint is a second secure element that is communicatively coupled with a second voice-communication device.

In some embodiments, the secure element uses a symmetric diversification algorithm to generate the first and second symmetric session keys for the secure voice session based on the obtained symmetric seed key. In some embodiments, the symmetric diversification algorithm includes an AES symmetric diversification algorithm.

In some embodiments, the secure element outputs each current twice-encrypted outbound-voice-packet payload of each current outbound voice packet prior to receiving a respective next outbound voice packet.

In some embodiments, the secure element is configured to buffer and process multiple outbound voice packets at a given time.

In some embodiments, each outbound-voice-packet header includes a respective index value, and generating the respective once-encrypted outbound-voice-packet payloads based on the respective outbound-voice-packet headers using the first symmetric encryption algorithm includes using the first symmetric encryption algorithm to generate the respective once-encrypted outbound-voice-packet payloads based on the respective index values in the respective outbound-voice-packet headers.

In some embodiments, each outbound-voice-packet header further includes a respective synchronization-source (SSRC) value, and generating the respective once-encrypted outbound-voice-packet payloads based on the respective outbound-voice-packet headers using the first symmetric encryption algorithm further includes using the first symmetric encryption algorithm to generate the respective once-encrypted outbound-voice-packet payloads based on the respective SSRC values in the respective outbound-voice-packet headers.

In some embodiments, the first symmetric encryption algorithm generates respective outbound-voice-packet authentication tags based on the first symmetric session key, the respective outbound-voice-packet headers, and the respective unencrypted outbound-voice-packet payloads, and outputs the respective outbound-voice-packet authentication tags to the voice-communication device for assembly with the respective outbound-voice-packet headers and the respective twice-encrypted outbound-voice-packet payloads for transmission to the endpoint in connection with the secure voice session.

In some embodiments, each outbound-voice-packet header includes a respective index value, and generating the respective outbound-voice-packet authentication tags based on the respective outbound-voice-packet headers using the first symmetric encryption algorithm includes using the first symmetric encryption algorithm to generate the respective outbound-voice-packet authentication tags based on the respective index values in the respective outbound-voice-packet headers.

In some embodiments, each outbound-voice-packet header further includes a respective SSRC value, and generating the respective outbound-voice-packet authentication tags based on the respective outbound-voice-packet headers using the first symmetric encryption algorithm further includes using the first symmetric encryption algorithm to generate the respective outbound-voice-packet authentication tags based on the respective SSRC values in the respective outbound-voice-packet headers.

In some embodiments, the method further includes the steps of (i) receiving inbound voice packets from the voice-communication device in connection with the secure voice session, where each inbound voice packet includes an inbound-voice-packet header and a twice-encrypted inbound-voice-packet payload; (ii) using the second symmetric encryption algorithm to generate respective once-encrypted inbound-voice-packet payloads based on the second symmetric session key and the respective twice-encrypted inbound-voice-packet payloads; (iii) using the first symmetric encryption algorithm to generate respective decrypted inbound-voice-packet payloads based on the first symmetric session key, the respective inbound-voice-packet headers, and the respective once-encrypted inbound-voice-packet payloads; and (iv) outputting the respective decrypted inbound-voice-packet payloads to the voice-communication device for (a) assembly with the respective inbound-voice-packet headers and (b) ensuing play-out of the decrypted inbound-voice-packet payloads via a user interface of the voice-communication device in connection with the secure voice session.

In some embodiments, the secure element outputs each current decrypted inbound-voice-packet payload of each current inbound voice packet prior to receiving a respective next inbound voice packet. In some embodiments, the secure element is configured to buffer and process multiple inbound voice packets at a given time. In some embodiments, each inbound-voice-packet header includes a respective index value, and generating the respective decrypted inbound-voice-packet payloads based on the respective inbound-voice-packet headers using the first symmetric encryption algorithm includes using the first symmetric encryption algorithm to generate the respective decrypted inbound-voice-packet payloads based on the respective index values in the respective inbound-voice-packet headers.

In some embodiments, each inbound-voice-packet header further includes a respective SSRC value, and generating the respective decrypted inbound-voice-packet payloads based on the respective inbound-voice-packet headers using the first symmetric encryption algorithm further includes using the first symmetric encryption algorithm to generate the respective decrypted inbound-voice-packet payloads based on the respective SSRC values in the respective inbound-voice-packet headers.

In some embodiments, each inbound voice packet further includes an inbound-voice-packet authentication tag, and the method further includes using the first symmetric encryption algorithm to authenticate the respective inbound voice packets based on the first symmetric session key.

In some embodiments, each inbound voice packet further includes an inbound-voice-packet authentication tag, and the method further includes using the first symmetric encryption algorithm to verify the integrity of the respective inbound voice packets based on the first symmetric session key.

In some embodiments, the first symmetric encryption algorithm is a published symmetric encryption algorithm and the second symmetric encryption algorithm is an unpublished symmetric encryption algorithm. In some such embodiments, the first symmetric encryption algorithm is an algorithm selected from the group consisting of an AES algorithm, a Blowfish algorithm, a DES algorithm, a Triple DES algorithm, a Serpent algorithm, and a Twofish algorithm.

In some embodiments, the first and second symmetric encryption algorithms are two different published symmetric encryption algorithms.

In some embodiments, the first and second symmetric encryption algorithms are two different unpublished symmetric encryption algorithm.

Another embodiment takes the form of a secure element that includes (i) a communication interface configured to be communicatively coupled with a voice-communication device; (ii) a session-negotiation module; (iii) a session-key-generation module; (iv) a first symmetric encryption module that implements a first symmetric encryption algorithm; and (v) a second symmetric encryption module that implements a second symmetric encryption algorithm.

In at least one embodiment, the session-negotiation module is configured to (i) perform a key-exchange procedure with an endpoint via the communication interface and the voice-communication device to obtain a symmetric seed key for a secure voice session with the endpoint and (ii) pass the obtained symmetric seed key to the session-key-generation module.

In at least one embodiment, the session-key-generation module is configured to (i) receive the obtained symmetric seed key from the session-negotiation module; (ii) generate first and second symmetric session keys for the secure voice session based on the obtained symmetric seed key; (iii) pass the first symmetric session key to the first symmetric encryption module; and (iv) pass the second symmetric session key to the second symmetric encryption module.

In at least one embodiment, the first symmetric encryption module is configured to (i) receive the first symmetric session key from the session-key-generation module; (ii) receive outbound voice packets from the voice-communication device via the communication interface as part of the secure voice session, each outbound voice packet comprising an outbound-voice-packet header and an unencrypted outbound-voice-packet payload; (iii) use the first symmetric encryption algorithm to generate once-encrypted outbound-voice-packet payloads based on the first symmetric session key, the outbound-voice-packet headers, and the unencrypted outbound-voice-packet payloads; and (iv) pass the once-encrypted outbound-voice-packet payloads to the second symmetric encryption module.

In at least one embodiment, the second symmetric encryption module is configured to (i) receive the second symmetric session key from the session-key-generation module; (ii) receive the once-encrypted outbound-voice-packet payloads from the first symmetric encryption module; (iii) use the second symmetric encryption algorithm to generate twice-encrypted outbound-voice-packet payloads based on the second symmetric session key and the once-encrypted outbound-voice-packet payloads; and (iv) output the twice-encrypted outbound-voice-packet payloads.

In at least one embodiment, the voice-communication device further includes an outbound-voice-packet-assembly module configured to (i) receive the outbound-voice-packet headers from the first symmetric encryption module; (ii) receive the twice-encrypted outbound-voice-packet payloads from the second symmetric encryption module; (iii) assemble twice-encrypted outbound voice packets from the outbound-voice-packet headers and the twice-encrypted outbound-voice-packet payloads; and (iv) output the assembled twice-encrypted outbound-voice-packet payloads to the voice-communication device for transmission to the endpoint in connection with the secure voice session.

In at least one embodiment, the second symmetric encryption module being configured to output the twice-encrypted outbound-voice-packet payloads includes the second symmetric encryption module being configured to output the twice-encrypted outbound-voice-packet payloads to the voice-communication device for assembly with the respective outbound-voice-packet headers for transmission to the endpoint in connection with the secure voice session.

In at least one embodiment, the key-exchange procedure includes a Diffie-Hellman key-exchange procedure. In at least one such embodiment, the Diffie-Hellman key-exchange procedure includes an elliptical-curve Diffie-Hellman key-exchange procedure.

In at least one embodiment, the session-negotiation module is further configured to perform an end-user-mutual-authentication procedure with the endpoint via the communication interface and the voice-communication device for the secure voice session. In at least one such embodiment, the end-user-mutual-authentication procedure includes a Diffie-Hellman end-user-mutual-authentication procedure; in at least one such embodiment, the Diffie-Hellman end-user-mutual-authentication procedure includes an elliptical-curve Diffie-Hellman end-user-mutual-authentication procedure.

In at least one embodiment, the endpoint is a second secure element that is communicatively coupled with a second voice-communication device.

In at least one embodiment, the session-key-generation module being configured to generate the first and second symmetric session keys for the secure voice session based on the obtained symmetric seed key includes the session-key-generation module being configured to use a symmetric diversification algorithm to generate the first and second symmetric session keys for the secure voice session based on the obtained symmetric seed key. In at least one such embodiment, the symmetric diversification algorithm includes an AES symmetric diversification algorithm.

In at least one embodiment, the secure element outputs a current twice-encrypted outbound-voice-packet payload of a current outbound voice packet prior to receiving a respective next outbound voice packet.

In at least one embodiment, the secure element is configured to buffer and process multiple outbound voice packets at a given time.

In at least one embodiment, each outbound-voice-packet header includes a respective index value; and the first symmetric encryption module being configured to use the first symmetric encryption algorithm to generate the once-encrypted outbound-voice-packet payloads based on the outbound-voice-packet headers includes the first symmetric encryption module being configured to use the first symmetric encryption algorithm to generate the once-encrypted outbound-voice-packet payloads based on the respective index values in the respective outbound-voice-packet headers.

In at least one such embodiment, each outbound-voice-packet header further includes a respective SSRC value; and the first symmetric encryption module being configured to use the first symmetric encryption algorithm to generate the once-encrypted outbound-voice-packet payloads based on the outbound-voice-packet headers further includes the first symmetric encryption module being configured to use the first symmetric encryption algorithm to generate the once-encrypted outbound-voice-packet payloads based on the respective SSRC values in the respective outbound-voice-packet headers.

In at least one embodiment, the first symmetric encryption module is further configured to (i) use the first symmetric encryption algorithm to generate respective outbound-voice-packet authentication tags based on the first symmetric session key, the respective outbound-voice-packet headers, and the respective unencrypted outbound-voice-packet payloads and (ii) output the respective outbound-voice-packet authentication tags for assembly with the respective outbound-voice-packet headers and the respective twice-encrypted outbound-voice-packet payloads for transmission to the endpoint in connection with the secure voice session.

In at least such one embodiment, each outbound-voice-packet header includes a respective index value; and the first symmetric encryption module being configured to use the first symmetric encryption algorithm to generate the respective outbound-voice-packet authentication tags based on the respective outbound-voice-packet headers includes the first symmetric encryption module being configured to use the first symmetric encryption algorithm to generate the respective outbound-voice-packet authentication tags based on the respective index values in the respective outbound-voice-packet headers.

In at least such one embodiment, each outbound-voice-packet header further includes a respective SSRC value; and the first symmetric encryption module being configured to use the first symmetric encryption algorithm to generate the respective outbound-voice-packet authentication tags based on the respective outbound-voice-packet headers further includes the first symmetric encryption module being configured to use the first symmetric encryption algorithm to generate the respective outbound-voice-packet authentication tags based on the respective SSRC values in the respective outbound-voice-packet headers.

In at least one embodiment, the secure element includes a component on a PCB of the voice-communication device.

In at least one embodiment, the secure element being configured to be communicatively coupled with the voice-communication device includes the secure element being configured to be communicatively coupled with the voice-communication device by way of an SPI connection.

In at least one embodiment, the secure element being configured to be communicatively coupled with the voice-communication device includes the secure element being configured to be communicatively coupled with the voice-communication device by way of a microSD interface.

In at least one embodiment, the secure element being configured to be communicatively coupled with the voice-communication device includes the secure element being configured to be communicatively coupled with the voice-communication device by way of a SIM interface.

In at least one embodiment, the voice-communication device includes a smartphone.

In at least one embodiment, the voice-communication device includes a headset.

In at least one embodiment, the second symmetric encryption module is further configured to (i) receive inbound voice packets from the endpoint via the voice-communication device and the communication interface, each inbound voice packet comprising an inbound-voice-packet header and a twice-encrypted inbound-voice-packet payload; (ii) use the second symmetric encryption algorithm to generate once-encrypted inbound-voice-packet payloads based on the second symmetric session key and the twice-encrypted inbound-voice-packet payloads; and (iii) pass the inbound-voice-packet headers and the once-encrypted inbound-voice-packet payloads to the first symmetric encryption module;

In at least one embodiment, the first symmetric encryption module is further configured to (i) receive the inbound-voice-packet headers and the once-encrypted inbound-voice-packet payloads from the second symmetric encryption module; (ii) use the first symmetric encryption algorithm to generate decrypted inbound-voice-packet payloads based on the first symmetric session key, the inbound-voice-packet headers, and the once-encrypted inbound-voice-packet payloads; and (iii) output the decrypted inbound-voice-packet payloads to the voice-communication device for assembly with the respective inbound-voice-packet headers and ensuing playout of the decrypted inbound-voice-packet payloads via a user interface of the voice-communication device in connection with the secure voice session.

In at least one embodiment, the secure element outputs each current decrypted inbound-voice-packet payload of each current inbound voice packet prior to receiving a respective next inbound voice packet.

In at least one embodiment, the secure element is configured to buffer and process multiple inbound voice packets at a given time.

In at least one embodiment, each inbound-voice-packet header includes a respective index value; and the first symmetric encryption module being configured to use the first symmetric encryption algorithm to generate the decrypted inbound-voice-packet payloads based on the inbound-voice-packet headers includes the first symmetric encryption module being configured to use the first symmetric encryption algorithm to generate the decrypted inbound-voice-packet payloads based on the respective index values in the respective inbound-voice-packet headers.

In at least one embodiment, each inbound-voice-packet header further includes a respective SSRC value; and the first symmetric encryption module being configured to use the first symmetric encryption algorithm to generate the decrypted inbound-voice-packet payloads based on the inbound-voice-packet headers further includes the first symmetric encryption module being configured to use the first symmetric encryption algorithm to generate the decrypted inbound-voice-packet payloads based on the respective SSRC values in the respective inbound-voice-packet headers.

In at least one embodiment, each inbound voice packet further includes an inbound-voice-packet-authentication tag, and the first symmetric encryption module is further configured to authenticate the inbound voice packets based on the respective inbound-voice-packet authentication tags.

In at least one embodiment, each inbound voice packet further includes an inbound-voice-packet-authentication tag, and the first symmetric encryption module is further configured to verify the integrity of the respective inbound voice packets based on the respective inbound-voice-packet authentication tags.

In at least one embodiment, the first symmetric encryption algorithm is a published symmetric encryption algorithm; and the second symmetric encryption algorithm is not a published symmetric encryption algorithm. In at least one such embodiment, the first symmetric encryption algorithm is an algorithm selected from the group consisting of an AES algorithm, a Blowfish algorithm, a DES algorithm, a Triple DES algorithm, a Serpent algorithm, and a Twofish algorithm.

In at least one embodiment, the first and second symmetric encryption algorithms are two different published symmetric encryption algorithms.

In at least one embodiment, the first and second symmetric encryption algorithms are two different unpublished symmetric encryption algorithms.

One embodiment takes the form of a secure element that includes (i) a session-key-generation module configured to generate a first session key and a second session key; (ii) a first symmetric encryption module that implements a first symmetric encryption algorithm using the first session key; (iii) a second symmetric encryption module that implements a second symmetric encryption algorithm using the second session key to generate a double-encrypted data stream, where the second symmetric encryption algorithm operates on an encrypted output of the first symmetric encryption module; and (iv) a communications interface configured to transmit the double-encrypted data stream to a voice-communication device.

In at least one embodiment, the secure element also includes a session-negotiation module that is configured to (i) perform a key-exchange procedure with an endpoint via the communication interface and the voice-communication device to obtain a symmetric seed key for a secure voice session with the endpoint and (ii) pass the obtained symmetric seed key to the session-key-generation module. In at least one such embodiment, the session-key-generation module is configured to (i) receive the obtained symmetric seed key from the session-negotiation module; (ii) generate the first and second symmetric session keys for the secure voice session based on the obtained symmetric seed key; (iii) pass the first symmetric session key to the first symmetric encryption module; and (iv) pass the second symmetric session key to the second symmetric encryption module.

In at least one embodiment, the first symmetric encryption module is configured to (i) receive the first symmetric session key from the session-key-generation module; (ii) receive outbound voice packets from the voice-communication device via the communication interface as part of the secure voice session, where each outbound voice packet includes an outbound-voice-packet header and an unencrypted outbound-voice-packet payload; (iii) use the first symmetric encryption algorithm to generate once-encrypted outbound-voice-packet payloads based on the first symmetric session key, the outbound-voice-packet headers, and the unencrypted outbound-voice-packet payloads; and (iv) pass the once-encrypted outbound-voice-packet payloads to the second symmetric encryption module.

In at least one embodiment, the second symmetric encryption module is configured to (i) receive the second symmetric session key from the session-key-generation module; (ii) receive the once-encrypted outbound-voice-packet payloads from the first symmetric encryption module; (iii) use the second symmetric encryption algorithm to generate twice-encrypted outbound-voice-packet payloads based on the second symmetric session key and the once-encrypted outbound-voice-packet payloads; and (iv) output the twice-encrypted outbound-voice-packet payloads.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

BRIEF DESCRIPTION OF THE DRAWINGS

Various example embodiments are described herein with reference to the following drawings, in which like numerals denote like entities.

FIG. 2A depicts a communication device without a secure element, FIG. 2B depicts a communication device with a removable secure element, in accordance with some embodiments, and FIG. 2C depicts a communication device with a non-removable secure element, in accordance with some embodiments.

FIGS. 5A-5E depict block diagrams of a secure element, in accordance with some embodiments.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

In the present disclosure, various elements of one or more of the described embodiments are referred to as modules that carry out (i.e., perform, execute, and the like) various functions described herein. As the term "module" is used herein, each described module includes or at least has access to any necessary hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes or at least has access to any necessary instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Figure 1:
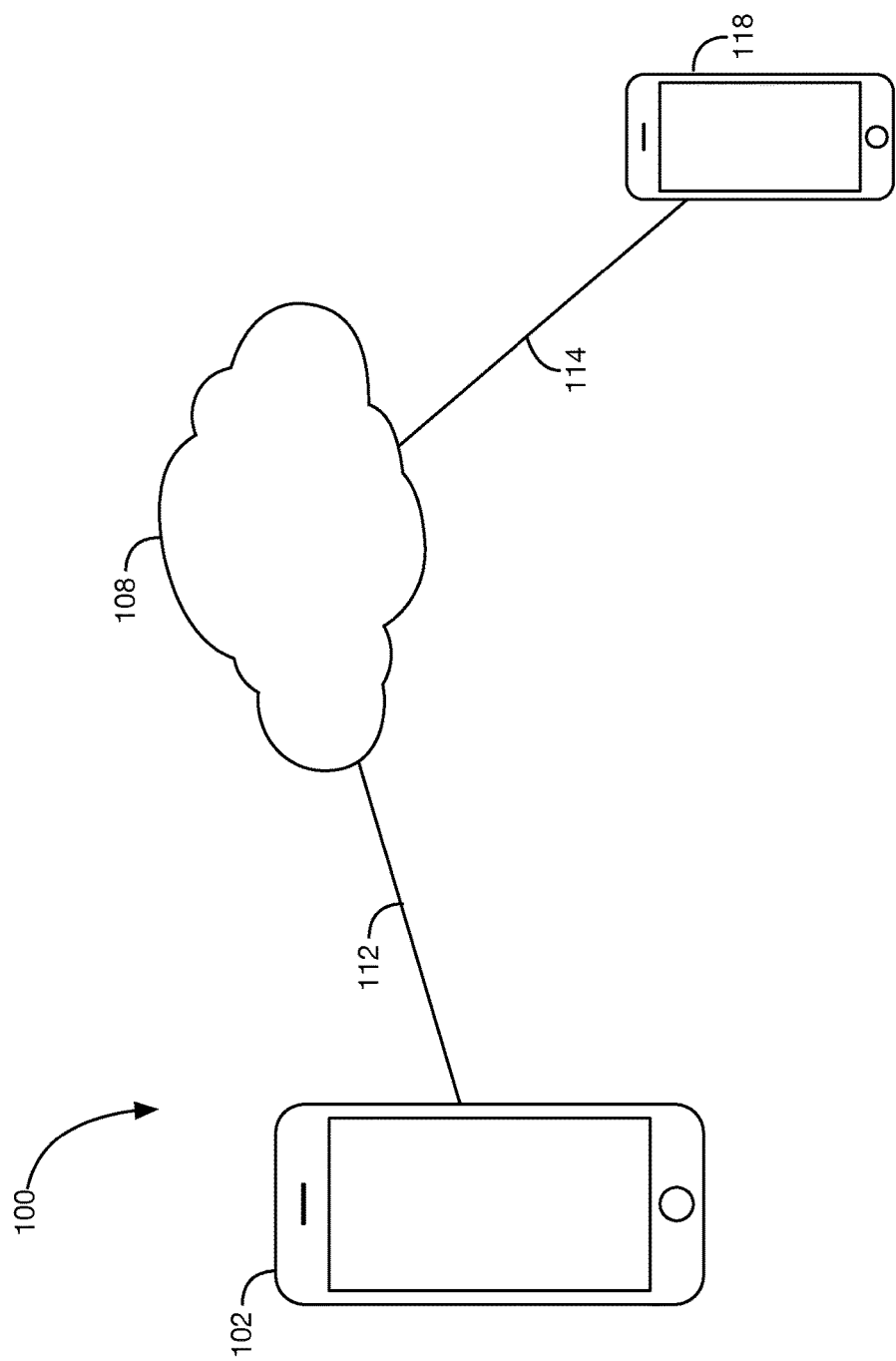
FIG. 1 depicts a communication system, in accordance with some embodiments.

FIG. 1 depicts a communication system 100, in accordance with at least one embodiment. As shown, a communication system 100 includes a local communication device 102, a network 108, and remote communication device 118.

Communication device 102 could take the form of, for example, a personal computer, a desktop computer, a laptop computer, a notebook computer, a tablet computer, a handheld computer, a wearable computer, a personal digital assistant (PDA), a feature phone, an optical head-mounted display (OHMD), and/or a smart watch, among numerous other possibilities that will be known to those of skill in the art. In the embodiment illustrated in FIG. 1, communication device 102 takes the form of a smartphone.

Remote communication device 118 may be any suitable device (or combination of devices) configured to perform the remote-endpoint functions described herein. In some embodiments, the remote communication device 118 takes a form similar to the communication device 102. In some configurations, remote communication device 118 could take the form of a cryptographic phone, a private branch exchange (PBX), an Internet protocol PBX (IP-PBX), and/or any other entity capable of carrying out the described remote-endpoint functions.

As shown in FIG. 1, local communication device 102 and remote communication device 118 communicate via network 108 using communication links 112 and 114, respectively. In some embodiments, network 108 is a wide area network (WAN) such as a cellular network, Wi-Fi network, or any other WAN known to those of skill in the art. Alternatively network 108 may be a personal area network (PAN), such as Bluetooth or near-field communication (NFC) networks, as well as various others known to those of skill in the art.

Figure 2A:
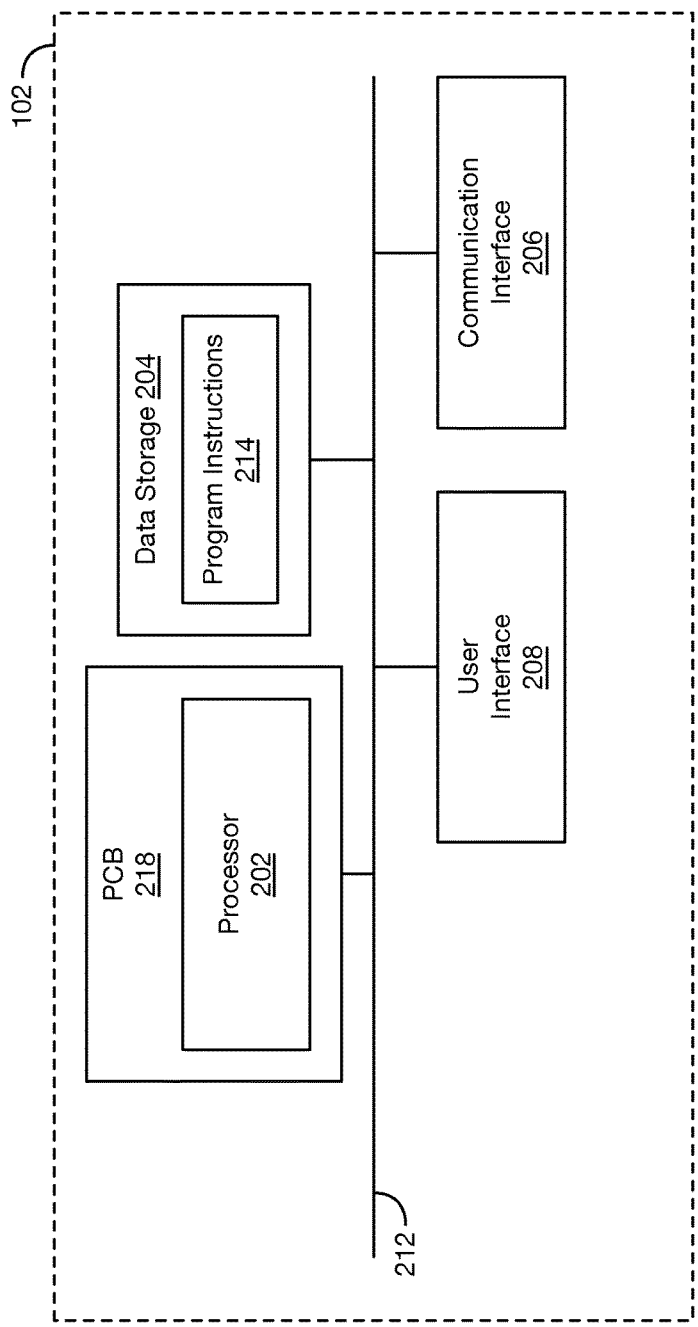
FIGS. 2A-2C depict block diagrams of a communication device, in accordance with some embodiments. In particular.

FIG. 2A depicts a block diagram of a communication device 102. As shown, communication device 102 includes a processor 202 attached to PCB 218, data storage 204 including program instructions 214, a communication interface 206, and a user interface 208, each of which is interconnected via a system bus 212. In the embodiment illustrated in FIG. 1, remote endpoint 106 takes the form of a cryptographic desk phone. Those having skill in the relevant art will appreciate that communication device 102 could have additional and/or different components, and perhaps a different arrangement of components, among many other possible variations that could be listed here.

Processor 202 may include one or more processors of any type deemed suitable by those of skill in the relevant art, some examples including a microprocessor, an application-specific integrated circuit (ASIC), and a digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used.

As depicted in FIG. 2A, data storage 204 contains program instructions 214 executable by processor 202 for carrying out various functions, though data storage 204 may contain different and/or additional data. In an embodiment in which local communication device 102 is configured to carry out one or more processes and/or functions (such as the processes and functions described with reference to FIG. 1), program instructions 214 are executable by processor 202 for carrying out those functions. In instances where other entities described herein have a structure similar to that of local communication device 102 as described in connection with at least FIG. 1, the respective program instructions 214 stored by the respective data storages 204 of those respective devices are executable by their respective processors 202 to carry out functions performed by those devices.

Communication interface 206 may include any necessary hardware (e.g., chipsets, antennas, Ethernet cards, etc.) and/or software for conducting one or more forms of communication with one or more other components and/or entities (such as local communication device 102 and remote communication device 118, as examples). Communication interface 206 may be configured to communicate according to one or more protocols such as Bluetooth, NFC, Infrared Data Association (IrDA), ZigBee, Wi-Fi, Universal Serial Bus (USB), IEEE 1394 (FireWire), and/or IEEE 802.3 (Ethernet)), as examples.

User interface 208 may include one or more displays, touchscreens, loudspeakers, microphones, dial keys, buttons, switches, light emitting diodes (LEDs), and the like. One or more user-interface components (e.g., an interactive touchscreen-and-display component) could provide both user-input and user-output functionality. And other user-interface components could be implemented in a given context, as known to those of skill in the art.

Figure 2B:
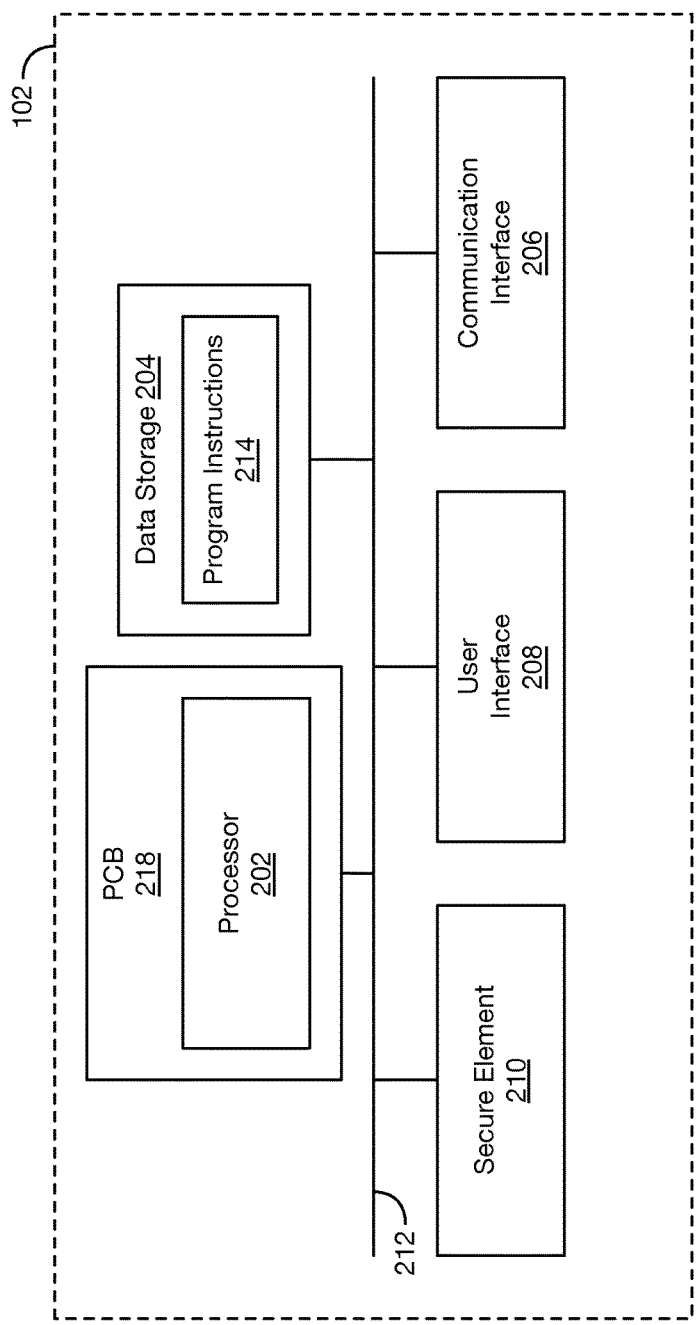
Figure 2C:
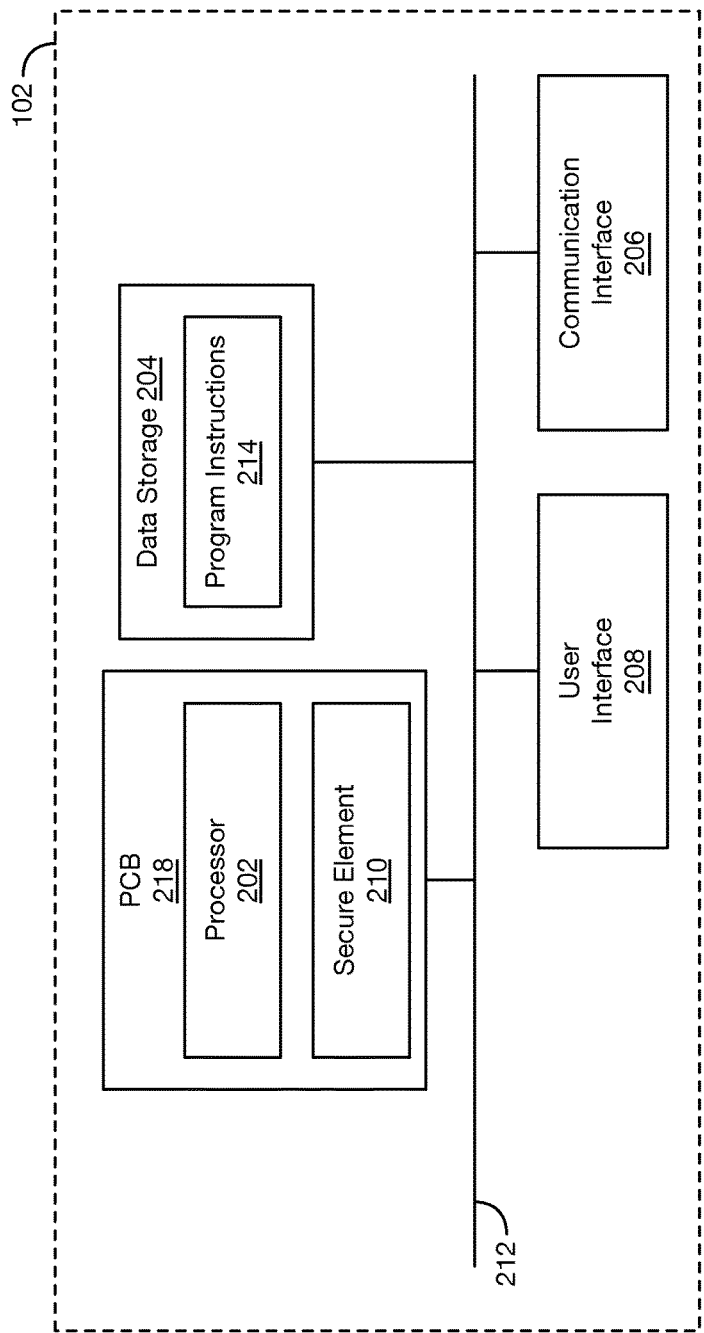

FIG. 2B depicts a communication device 102, in accordance with some embodiments. As shown, communication device 102 in FIG. 2B is similar to the communication device 102 shown in FIG. 2A, with the addition of secure element 210. Secure element 210 may include hardware and/or software for performing cryptographic functions or processes—e.g., encryption, decryption, signature generation, signature verification, and/or key generation. In an embodiment, secure element 210 is contained within an explicitly defined perimeter that establishes the physical bounds of the cryptographic module and that contains any processors and/or other hardware components that store and protect any software and firmware components of the cryptographic module. In some embodiments, secure element 210 could take the form of (or include) a secure cryptoprocessor, a smart card, a secure digital (SD) card, a micro SD card, a SIM card, and/or any other cryptographic module, as known to one of skill in the art that may be inserted into communication device 102. In FIG. 2B, secure element 210 may be a micro SD card (or any other known form factor) configured to communicate with processor 202 on PCB 218 via a system bus 212. FIG. 2C depicts an alternative embodiment of communication device 102, in which the secure element 210 may be physically connected (soldered) to PCB 218.

Figure 3:
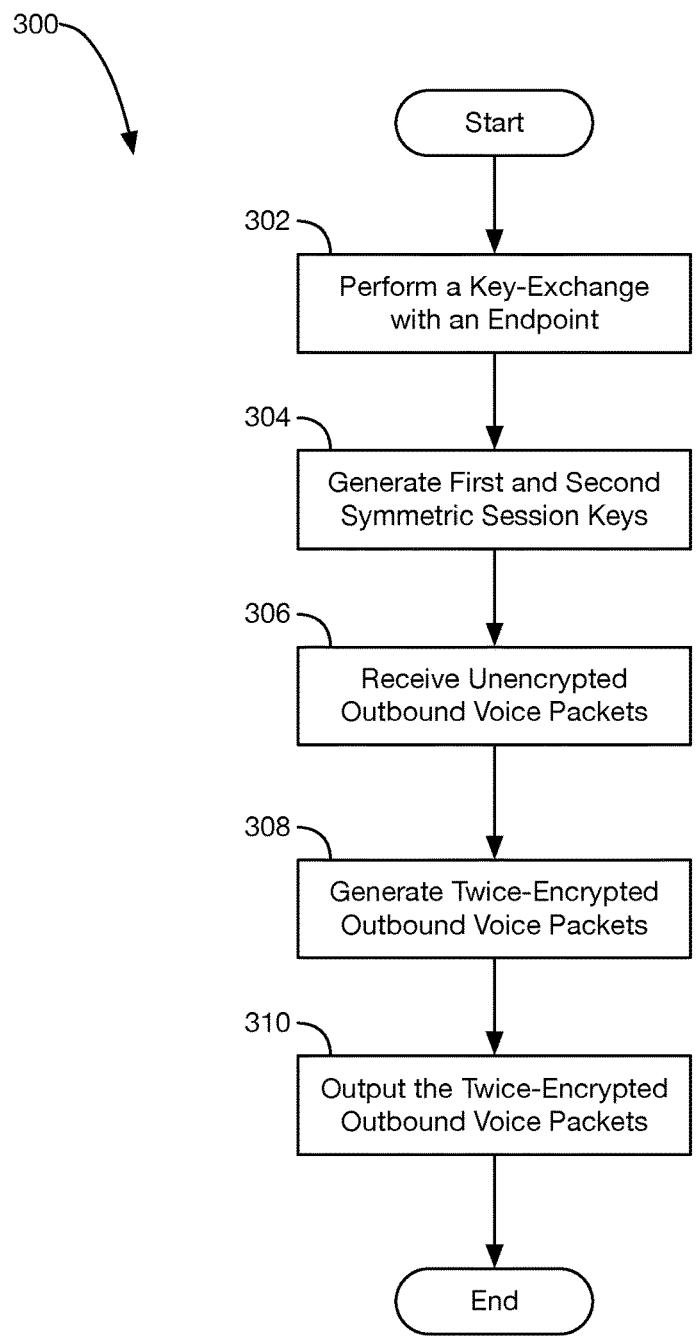
FIG. 3 depicts a flowchart of a method, in accordance with some embodiments.

FIG. 3 depicts a flowchart of a method, in accordance with some embodiments. As shown, method 300 begins at step 302 by performing a key-exchange procedure with an endpoint via the voice-communication device to obtain a symmetric seed key for a secure voice session with the endpoint. At step 304, first and second symmetric session keys are generated for the secure voice session based on the obtained symmetric seed key. At step 306, outbound voice packets are received from the voice-communication device in connection with the secure voice session, each outbound voice packet comprising an outbound-voice-packet header and an unencrypted outbound-voice-packet payload. At step 308, twice-encrypted outbound voice packets are generated using first and second symmetric encryption algorithms. The first symmetric encryption algorithm generates respective once-encrypted outbound-voice-packet payloads based on the first symmetric session key, the respective outbound-voice-packet headers, and the respective unencrypted outbound-voice-packet payloads. The second symmetric encryption algorithm generates respective twice-encrypted outbound-voice-packet payloads based on the second symmetric session key and the respective once-encrypted outbound-voice-packet payloads. At step 310, the respective twice-encrypted outbound-voice-packet payloads are output to the voice-communication device for assembly with the respective outbound-voice-packet headers for transmission to the endpoint in connection with the secure voice session.

In some embodiments, the secure element is a component implemented on a PCB of the voice-communication device. In some embodiments, the secure element is communicatively coupled with the voice-communication device via an SPI connection.

In some embodiments, the secure element is communicatively coupled with the voice-communication device via a microSD interface. In some embodiments, the secure element is communicatively coupled with the voice-communication device via a SIM interface.

In some embodiments, the voice-communication device includes a smartphone. In some embodiments, the voice-communication device includes a headset.

In some embodiments, the key-exchange procedure includes a Diffie-Hellman key-exchange procedure. In some embodiments, the Diffie-Hellman key-exchange procedure includes an elliptical-curve Diffie-Hellman key-exchange procedure.

In some embodiments, the method further includes performing an end-user-mutual-authentication procedure with the endpoint via the voice-communication device for the secure voice session. In some embodiments, the end-user-mutual-authentication procedure includes a Diffie-Hellman end-user-mutual-authentication procedure. In some embodiments, the Diffie-Hellman end-user-mutual-authentication procedure includes an elliptical-curve Diffie-Hellman end-user-mutual-authentication procedure.

In some embodiments, the endpoint is a second secure element that is communicatively coupled with a second voice-communication device.

In some embodiments, the method further includes using the first symmetric encryption algorithm to generate respective outbound-voice-packet authentication tags based on the first symmetric session key, the respective outbound-voice-packet headers, and the respective unencrypted outbound-voice-packet payloads, and outputting the respective outbound-voice-packet authentication tags to the voice-communication device for assembly with the respective outbound-voice-packet headers and the respective twice-encrypted outbound-voice-packet payloads for transmission to the endpoint in connection with the secure voice session.

In some embodiments, the method further includes receiving inbound voice packets from the voice-communication device in connection with the secure voice session, each inbound voice packet comprising an inbound-voice-packet header and twice-encrypted inbound-voice-packet payload, using the second symmetric encryption algorithm to generate respective once-encrypted inbound-voice-packet payloads based on the second symmetric session key and the respective twice-encrypted inbound-voice-packet payloads, using the first symmetric encryption algorithm to generate respective decrypted inbound-voice-packet payloads based on the first symmetric session key, the respective inbound-voice-packet headers, and the respective once-encrypted inbound-voice-packet payloads, and outputting the respective decrypted inbound-voice-packet payloads to the voice-communication device for reassembly with the respective inbound-voice-packet headers and ensuing play-out of the decrypted inbound-voice-packet payloads via a user interface of the voice-communication device in connection with the secure voice session.

In some embodiments, each inbound voice packet further includes an inbound-voice-packet authentication tag, and the method further includes using the first symmetric encryption algorithm to authenticate the respective inbound voice packets based on the respective inbound-voice-packet authentication tags.

In some embodiments, each inbound voice packet further includes an inbound-voice-packet authentication tag, and the method further includes using the first symmetric encryption algorithm to verify the integrity of the respective inbound voice packets based on the respective inbound-voice-packet authentication tags.

In some embodiments, the first symmetric encryption algorithm is a published symmetric encryption algorithm and the second symmetric encryption algorithm is not a published symmetric encryption algorithm. In some embodiments, the first symmetric encryption algorithm is an algorithm selected from the group consisting of an AES algorithm, a Blowfish algorithm, a DES algorithm, a Triple DES algorithm, a Serpent algorithm, and a Twofish algorithm. In some embodiments, the first and second symmetric encryption algorithms are two different published symmetric encryption algorithms.

In some embodiments, the methods and systems described herein may take the form of various components. In some embodiments, the methods may be implemented using chips, processors, and various other components soldered to a PCB in a communication device. Alternatively, the methods may be implemented on a microSD card, a SIM card, or various other form factors that may be inserted into the communication device. In some embodiments, the secure element may be implemented on a device that is communicatively coupled to the communication device.

Figure 4:
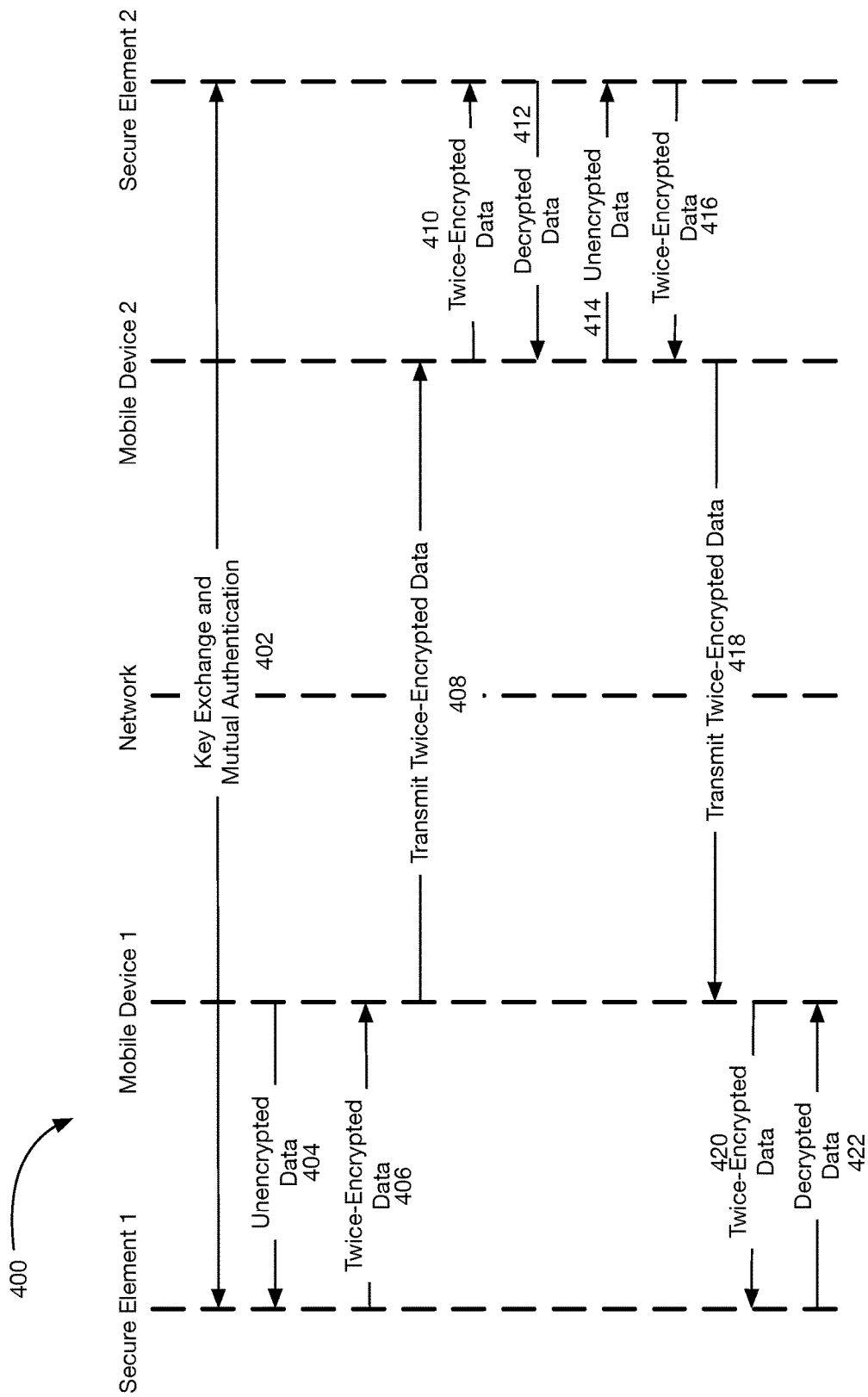
FIG. 4 depicts a call-flow diagram of a process, in accordance with some embodiments.

FIG. 4 depicts a call-flow diagram 400, in accordance with some embodiments. As shown, secure element 1 performs a key exchange with secure element 2 at 402. In some cases, the key exchange is performed via a Diffie-Hellman procedure. In some embodiments, a mutual authentication is also performed. Secure element 1 receives an unencrypted data packet from mobile device 1 at 404. As mentioned above, the unencrypted data packet may be voice data, however it may also be another form of data packet such as text, video or images as well. The secure element 1 generates, at 406, a twice-encrypted data packet based on the encryption algorithms described in method 300. The twice-encrypted data packet is sent, at 408, from mobile device 1 to mobile device 2 via the network. In some embodiments the network may be a wide-area network (WAN) such as a cellular network, Wi-Fi, or various other WANs known to those of skill in the art. Alternatively, the mobile devices 1 and 2 may communicate with each other via personal-area networks (PANs), such as Bluetooth, or near-field communication (NFC) networks, for transmitting images or text, in some embodiments.

Secure element 2 receives, at 410, the twice-encrypted data packet from mobile device 2, and using the decryption algorithms described above, generates, at 412, a decrypted data packet and provides it to mobile device 2. A user may provide input to mobile device 2, which may provide, at step 414, the input to secure element 2 in the form of an unencrypted data packet. The secure element 2 similarly creates, at step 416, a twice-encrypted data packet to transmit, at step 418, back to mobile device 1 using mobile device 2 via the network. The mobile device 1 hands the received twice-encrypted data packet to secure element 1 at 420, which decrypts it using similar algorithms used to generate, at 422, the twice-encrypted data packet, and outputs the decrypted data packet to mobile device 1 for play-out, for example.

Figure 5A:
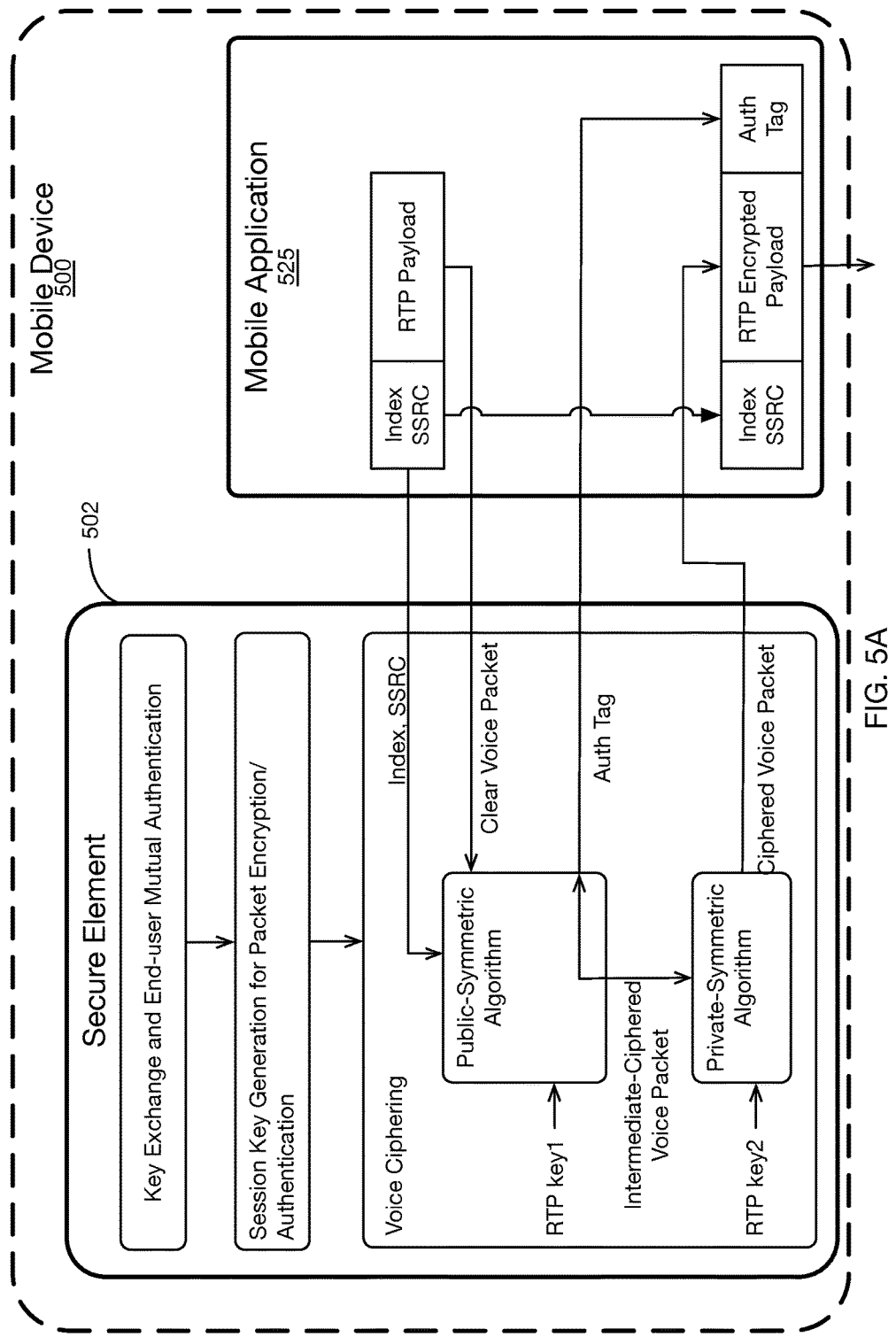
Figure 5B:
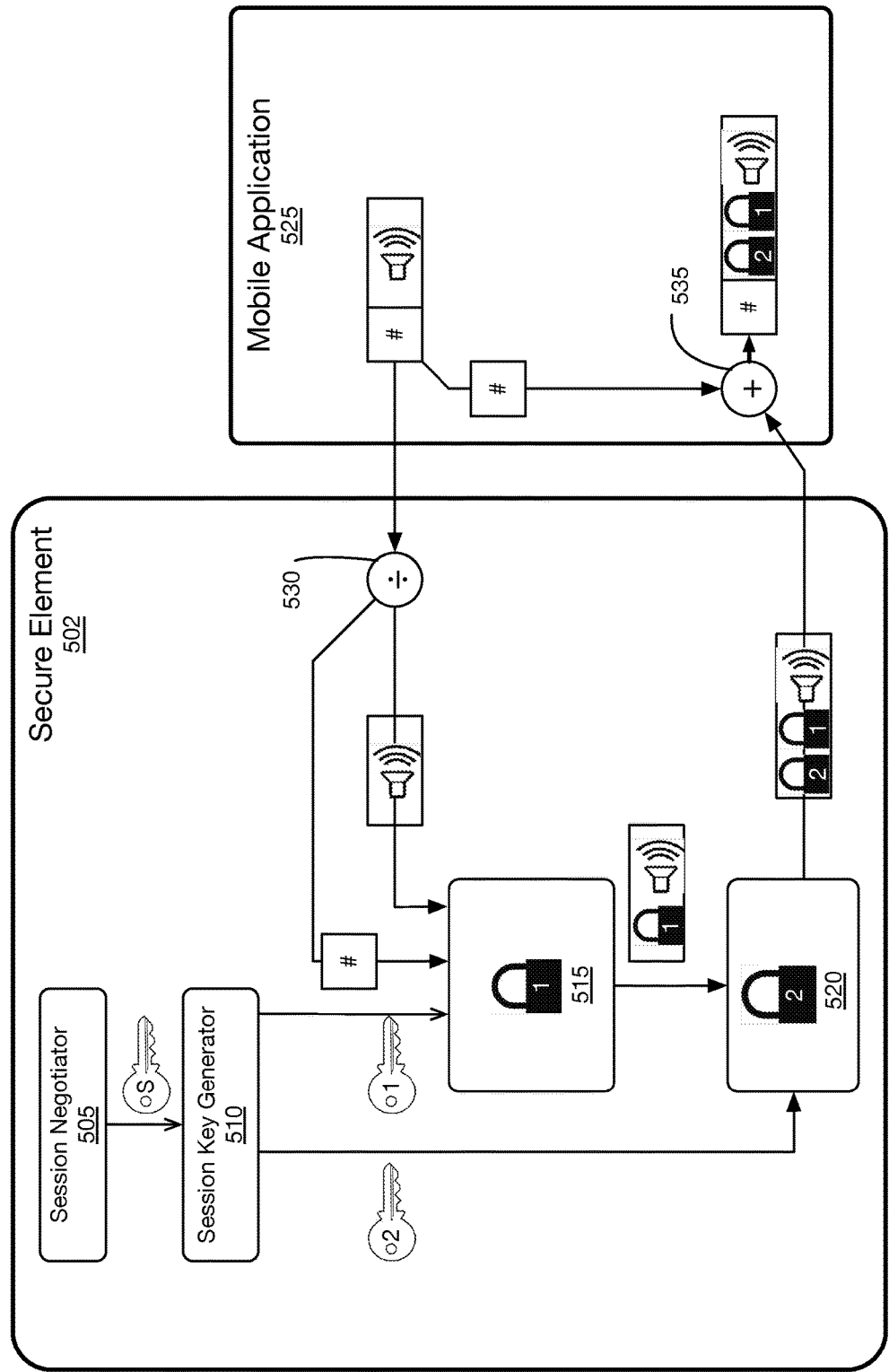

FIG. 5A depicts a block diagram of a mobile device 500, in accordance with some embodiments. Various embodiments will be described with relation to FIGS. 5B-5E. FIG. 5B depicts secure element 502, in accordance with some embodiments. As shown, secure element 502 includes a session negotiation module 505, a session-key generation module 510, a first symmetric encryption algorithm 515, and a second symmetric encryption algorithm 520. For convenience, mobile application 525 is also shown to illustrate packetizing, in accordance with some embodiments. Mobile application 525 may be running on a voice-communication device, or any other type of communication device. Embodiments, described herein are associated with voice-communication devices, however it should be noted that other types of communication devices are possible. Some examples are text-communication devices, audio communication devices, video communication devices, and the like. Session negotiation module 505 is configured to perform a key-exchange procedure with an endpoint via the communication interface and the voice-communication device to obtain a symmetric seed key 'S' for a secure voice session with the endpoint, and to pass the obtained symmetric seed key to the session-key-generation module. In some embodiments, the session negotiation module 505 uses an elliptic curve digital signature algorithm (ECDSA). The session-key generation module 510 receives the obtained symmetric seed key 'S' from the session-negotiation module, generates first and second symmetric session keys '1' and '2' for the secure voice session based on the obtained symmetric seed key, passes the first symmetric session key '1' to the first symmetric encryption module 515, and passes the second symmetric session key '2' to the second symmetric encryption module 520.

In some embodiments, the session-key-generation module being configured to generate the first and second symmetric session keys for the secure voice session based on the obtained symmetric seed key includes configuring the session-key-generation module to use a symmetric diversification algorithm to generate the first and second symmetric session keys for the secure voice session based on the obtained symmetric seed key. In some embodiment, the symmetric diversification includes an AES symmetric diversification algorithm.

The first symmetric encryption module 515 is configured to receive the first symmetric session key '1' from the session-key-generation module 510 and to receive outbound voice packets from the voice-communication device via the communication interface as part of the secure voice session. Each received outbound voice packet includes an outbound-voice-packet header and an unencrypted outbound-voice-packet payload. The outbound-voice-packet header ensures each packet of unencrypted outbound-voice-packet payload is uniquely encrypted, regardless of content. In some embodiments, the received unencrypted outbound voice packet includes a 16-bit outbound-voice-packet header attached to the unencrypted outbound-voice-packet payload. In such embodiments, the header may be parsed from the payload using a parser in the secure element, shown as parser 530. In some embodiments, first symmetric encryption module 515 generates once-encrypted outbound-voice-packet payloads based on the first symmetric session key '1', the outbound-voice-packet headers, and the unencrypted outbound-voice-packet payloads, and passes the once-encrypted outbound-voice-packet payloads to the second symmetric encryption module 520.

Figure 5C:
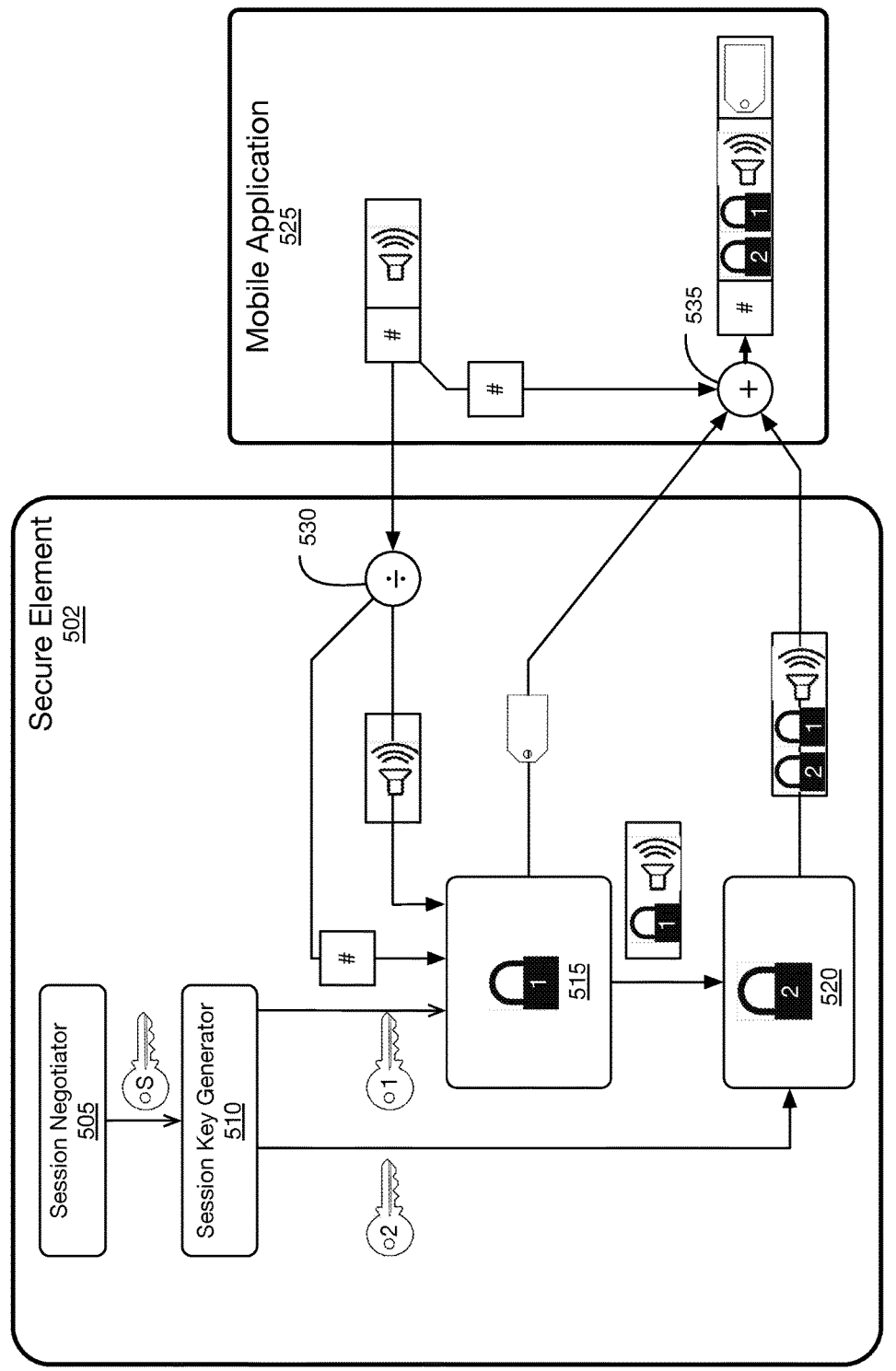

In some embodiments, the first symmetric encryption module 515 is further configured to use the first symmetric encryption algorithm to generate respective outbound-voice-packet authentication tags based on the first symmetric session key, the respective outbound-voice-packet headers, and the respective unencrypted outbound-voice-packet payloads, and output the respective outbound-voice-packet authentication tags for assembly with the respective outbound-voice-packet headers and the respective twice-encrypted outbound-voice-packet payloads for transmission to the endpoint in connection with the secure voice session (as shown in FIG. 5C).

In some embodiments, each outbound-voice-packet header includes a respective index value, and the first symmetric encryption module 515 being configured to use the first symmetric encryption algorithm to generate the respective outbound-voice-packet authentication tags based on the respective outbound-voice-packet headers includes the first symmetric encryption module 515 being configured to use the first symmetric encryption algorithm to generate the respective outbound-voice-packet authentication tags based on the respective index values in the respective outbound-voice-packet headers.

In some embodiments, each outbound-voice-packet header further includes a respective SSRC value, and the first symmetric encryption module 515 being configured to use the first symmetric encryption algorithm to generate the respective outbound-voice-packet authentication tags based on the respective outbound-voice-packet headers further includes the first symmetric encryption module 515 being configured to use the first symmetric encryption algorithm to generate the respective outbound-voice-packet authentication tags based on the respective SSRC values in the respective outbound-voice-packet headers.

The second symmetric encryption module 520 is configured to receive the second symmetric session key '2' from the session-key-generation module 510 and to receive the once-encrypted outbound-voice-packet payloads from the first symmetric encryption module 515. The second symmetric encryption module 520 generates twice-encrypted outbound-voice-packet payloads based on the second symmetric session key '2' and the once-encrypted outbound-voice-packet payloads, and passes the twice-encrypted outbound-voice-packet payloads to the outbound-voice-packet-assembly module 535 in mobile application 525.

In some embodiments, the outbound-voice-packet-assembly module 535 in the voice-communication device is configured to receive the outbound-voice-packet headers and, in some embodiments, the outbound-voice-packet authentication tags from the first symmetric encryption module 515, and to receive the twice-encrypted outbound-voice-packet payloads from the second symmetric encryption module 520. The outbound-voice-packet-assembly module 530 assembles twice-encrypted outbound voice packets from the outbound-voice-packet headers, the twice-encrypted outbound-voice-packet payloads, and in some embodiments, the outbound-voice-packet authentication tags, and outputs the assembled twice-encrypted outbound voice packets via the communication interface to the voice-communication device for transmission to the endpoint as part of the secure voice sessions.

In some embodiments, the second symmetric encryption module 520 being configured to output the twice-encrypted outbound-voice-packet payloads includes configuring the second symmetric encryption module to output the twice-encrypted outbound-voice-packet payloads to the voice-communication device for assembly with the respective outbound-voice-packet headers for transmission to the endpoint in connection with the secure voice session.

In some embodiments, the key-exchange procedure includes a Diffie-Hellman key-exchange procedure. In some embodiments, the Diffie-Hellman key-exchange procedure includes an elliptical-curve Diffie-Hellman key-exchange procedure.

In some embodiments, the session-negotiation module 505 is further configured to perform an end-user-mutual-authentication procedure with the endpoint via the communication interface and the voice-communication device for the secure voice session. In some embodiments, the enduser-mutual-authentication procedure includes a Diffie-Hellman end-user-mutual-authentication procedure. In some embodiments, the Diffie-Hellman end-user-mutual-authentication procedure includes an elliptical-curve Diffie-Hellman end-user-mutual-authentication procedure.

In some embodiments, the endpoint is a second secure element that is communicatively coupled with a second voice-communication device. In some embodiments, the secure element 502 includes a component on a PCB of the voice-communication device. In some embodiments, the secure element 502 is configured to be communicatively coupled with the voice-communication device includes the secure element being configured to be communicatively coupled with the voice-communication device by way of a microSD interface. In some embodiments, configuring the secure element to be communicatively coupled with the voice-communication device includes configuring the secure element being to be communicatively coupled with the voice-communication device by way of a SIM interface. In some embodiments, the voice-communication device includes a smartphone. In some embodiments, the voice-communication device includes a headset.

In some embodiments, the first symmetric encryption algorithm 515 is a published symmetric encryption algorithm, and the second symmetric encryption algorithm 520 is not a published symmetric encryption algorithm. In some embodiments, the first symmetric encryption algorithm is an algorithm selected from the group consisting of an AES algorithm, a Blowfish algorithm, a DES algorithm, a Triple DES algorithm, a Serpent algorithm, and a Twofish algorithm. In some embodiments, the first and second symmetric encryption algorithms are two different published symmetric encryption algorithms.

FIG. 5D depicts an embodiment of secure element 502 decrypting received twice-encrypted voice packets. As shown, the second symmetric encryption module 520 receives twice-encrypted inbound voice packets from the endpoint via the voice-communication device running mobile application 525 and the communication interface, where each such received twice-encrypted inbound voice packet includes an inbound-voice-packet header and a twice-encrypted inbound-voice-packet payload. The second symmetric encryption module 520 generates once-encrypted inbound-voice-packet payloads based on the second symmetric session key '2' and the twice-encrypted inbound-voice-packet payloads, and passes the inbound-voice-packet headers and the once-encrypted inbound-voice-packet payloads to the first symmetric encryption module 515.

The first symmetric encryption module 515 receives the inbound-voice-packet headers and the once-encrypted inbound-voice-packet payloads from the second symmetric encryption module, and generates decrypted inbound-voice-packet payloads based on the first symmetric session key '1', the inbound-voice-packet headers, and the once-encrypted inbound-voice-packet payloads. The first symmetric encryption module 515 outputs the decrypted inbound-voice-packet payloads to the voice-communication device for assembly with the respective inbound-voice-packet headers and ensuing playout of the decrypted inbound-voice-packet payloads via a user interface of the voice-communication device in connection with the secure voice session.

In some embodiments, the secure element outputs each current decrypted inbound-voice-packet payload of each current inbound voice packet prior to receiving a respective next inbound voice packet.

In some embodiments, the secure element is configured to buffer and process multiple inbound voice packets at a given time.

In some embodiments, each inbound-voice-packet header includes a respective index value, and the first symmetric encryption module being configured to use the first symmetric encryption algorithm to generate the decrypted inbound-voice-packet payloads based on the inbound-voice-packet headers includes the first symmetric encryption module being configured to use the first symmetric encryption algorithm to generate the decrypted inbound-voice-packet payloads based on the respective index values in the respective inbound-voice-packet headers.

In some embodiments, each inbound-voice-packet header further includes a respective SSRC value, and the first symmetric encryption module being configured to use the first symmetric encryption algorithm to generate the decrypted inbound-voice-packet payloads based on the inbound-voice-packet headers further includes the first symmetric encryption module being configured to use the first symmetric encryption algorithm to generate the decrypted inbound-voice-packet payloads based on the respective SSRC values in the respective inbound-voice-packet headers.

In some embodiments, each inbound voice packet further includes an inbound-voice-packet-authentication tag, and the first symmetric encryption module is further configured to authenticate the inbound voice packets based on the respective inbound-voice-packet authentication tags (as shown in FIG. 5E). In some embodiments, each inbound voice packet further includes an inbound-voice-packet-authentication tag, and the first symmetric encryption module is further configured to verify the integrity of the respective inbound voice packets based on the respective inbound-voice-packet authentication tags.

Although features and elements are described above in particular combinations, those having ordinary skill in the art will appreciate that each feature or element can be used alone or in any combination with the other features and elements without departing from the scope and spirit of the present disclosure. Embodiments described in the form of a method may have analogous system embodiments, and vice versa.

What is claimed is:

1. A method comprising:
   exchanging keys with an endpoint via a voice-communication device to obtain a symmetric seed key for a secure voice session with the endpoint;
   generating via a symmetric diversification algorithm, symmetrically diverse first and second symmetric session keys for the secure voice session based on the obtained symmetric seed key;
   receiving outbound voice packets from the voice-communication device in connection with the secure voice session, each outbound voice packet including an outbound-voice-packet header and an unencrypted outbound-voice-packet payload;
   generating once-encrypted outbound-voice-packet payloads based on the first symmetric session key, the respective outbound-voice-packet headers, and the respective unencrypted outbound-voice-packet payloads;
   generating twice-encrypted outbound-voice-packet payloads based on the second symmetric session key and the respective once-encrypted outbound-voice-packet payloads; and providing the respective twice-encrypted outbound-voice-packet payloads to the voice-communication device for assembly with the respective outbound-voice-packet headers for transmission to the endpoint in connection with the secure voice session.

2. The method of claim 1, wherein the generating symmetrically diverse first and second symmetric session keys for the secure voice session based on the obtained symmetric seed key occurs on a secure element as a component on a printed circuit board (PCB) of the voice-communication device.

3. The method of claim 1, wherein the generating symmetrically diverse first and second symmetric session keys for the secure voice session based on the obtained symmetric seed key occurs on a secure element communicatively coupled with the voice-communication device via a microSD interface.

4. The method of claim 1, wherein the generating symmetrically diverse first and second symmetric session keys for the secure voice session based on the obtained symmetric seed key occurs on a secure element communicatively coupled with the voice-communication device via a secure identity module (SIM) interface.

5. The method of claim 1, wherein the key exchanging is via a Diffie-Hellman key-exchange procedure.

6. The method of claim 5, wherein the Diffie-Hellman key-exchange procedure comprises an elliptical-curve Diffie-Hellman key-exchange procedure.

7. The method of claim 1, wherein:
each outbound-voice-packet header includes a respective index value; and
generating the respective once-encrypted outbound-voice-packet payloads based on the respective outbound-voice-packet headers includes generating the respective once-encrypted outbound-voice-packet payloads based on the respective index values in the respective outbound-voice-packet headers.

8. The method of claim 7, wherein:
each outbound-voice-packet header further comprises a respective synchronization-source (SSRC) value; and
using a first symmetric encryption algorithm to generate the respective once-encrypted outbound-voice-packet payloads based on the respective SSRC values in the respective outbound-voice-packet headers.

9. The method of claim 1, further comprising:
generating respective outbound-voice-packet authentication tags based on the first symmetric session key, the respective outbound-voice-packet headers, and the respective unencrypted outbound-voice-packet payloads; and
outputting the respective outbound-voice-packet authentication tags to the voice-communication device for assembly with the respective outbound-voice-packet headers and the respective twice-encrypted outbound-voice-packet payloads for transmission to the endpoint in connection with the secure voice session.

10. The method of claim 9, wherein:
each outbound-voice-packet header includes a respective index value; and
generating the respective outbound-voice-packet authentication tags based on the respective outbound-voice-packet headers includes generating the respective outbound-voice-packet authentication tags based on the respective index values in the respective outbound-voice-packet headers.

11. The method of claim 10, wherein:
each outbound-voice-packet header further comprises a respective synchronization-source (SSRC) value; and
generating the respective outbound-voice-packet authentication tags based on the respective outbound-voice-packet headers includes generating the respective outbound-voice-packet authentication tags based on the respective SSRC values in the respective outbound-voice-packet headers.

12. The method of claim 1, further comprising:
receiving inbound voice packets from the voice-communication device in connection with the secure voice session, each inbound voice packet including an inbound-voice-packet header and a twice-encrypted inbound-voice-packet payload;
generating respective once-encrypted inbound-voice-packet payloads based on the second symmetric session key and the respective twice-encrypted inbound-voice-packet payloads;
generating respective decrypted inbound-voice-packet payloads based on the first symmetric session key, the respective inbound-voice-packet headers, and the respective once-encrypted inbound-voice-packet payloads; and
providing the respective decrypted inbound-voice-packet payloads to the voice-communication device for assembly with the respective inbound-voice-packet headers and ensuing playout of the decrypted inbound-voice-packet payloads via a user interface of the voice-communication device in connection with the secure voice session.

13. The method of claim 12, wherein:
each inbound-voice-packet header comprises a respective index value; and
generating the respective decrypted inbound-voice-packet payloads based on the respective inbound-voice-packet headers includes generating the respective decrypted inbound-voice-packet payloads based on the respective index values in the respective inbound-voice-packet headers.

14. The method of claim 13, wherein:
each inbound-voice-packet header further comprises a respective synchronization-source (SSRC) value; and
generating the respective decrypted inbound-voice-packet payloads based on the respective inbound-voice-packet headers further comprises generating the respective decrypted inbound-voice-packet payloads based on the respective SSRC values in the respective inbound-voice-packet headers.

15. The method of claim 12, wherein each inbound voice packet further comprises an inbound-voice-packet authentication tag, the method further comprising:
authenticating the respective inbound voice packets based on the respective inbound-voice-packet authentication tags.

16. The method of claim 12, wherein each inbound voice packet further comprises an inbound-voice-packet authentication tag, the method further comprising:
verifying the integrity of the respective inbound voice packets based on the respective inbound-voice-packet authentication tags.

17. The method of claim 1, wherein:
generating once-encrypted outbound-voice-packet payloads based on the first symmetric session key, the respective outbound-voice-packet headers, and the respective unencrypted outbound-voice-packet payloads is through a published symmetric encryption algorithm; and generating twice-encrypted outbound-voice-packet payloads based on the second symmetric session key and the respective once-encrypted outbound-voice-packet payloads is through an unpublished symmetric encryption algorithm.

18. The method of claim 1, wherein the generating once-encrypted outbound-voice-packet payloads and the generating twice-encrypted outbound-voice-packet payloads is through two different published symmetric encryption algorithms.

19. The method of claim 1, wherein the generating once-encrypted outbound-voice-packet payloads and the generating twice-encrypted outbound-voice-packet payloads is through two different unpublished symmetric encryption algorithms.

20. The method as claimed in claim 1, wherein the symmetric diversification algorithm comprises an AES symmetric diversification algorithm.

21. A communication device comprising:
a buffer;
a hardware processor coupled to the buffer;
a communications interface;
a non-transitory computer readable storage medium comprising program instructions for:
exchanging keys with an endpoint via the communications interface to obtain a symmetric seed key for a secure voice session with the endpoint;
generating via a symmetric diversification algorithm, symmetrically diverse first and second symmetric session keys for the secure voice session based on the obtained symmetric seed key;
receiving outbound voice packets from the communications interface in connection with the secure voice session, each outbound voice packet including an outbound-voice-packet header and an unencrypted outbound-voice-packet payload;
generating once-encrypted outbound-voice-packet payloads based on the first symmetric session key, the respective outbound-voice-packet headers, and the respective unencrypted outbound-voice-packet payloads;
generating twice-encrypted outbound-voice-packet payloads based on the second symmetric session key and the respective once-encrypted outbound-voice-packet payloads; and
providing the respective twice-encrypted outbound-voice-packet payloads to the communications interface for assembly with the respective outbound-voice-packet headers for transmission to the endpoint in connection with the secure voice session.

22. The communication device as claimed in claim 21, wherein the symmetric diversification algorithm comprises an AES symmetric diversification algorithm.

23. The communication device as claimed in claim 21, wherein the program instructions for exchanging keys comprises program instructions for exchanging keys via a Diffie-Hellman key-exchange procedure.

24. The communication device as claimed in claim 21, wherein the program instructions for exchanging keys comprises program instructions for exchanging keys via an elliptical-curve Diffie-Hellman key-exchange procedure.

25. The communication device as claimed in claim 21, wherein the program instructions further comprise program instructions for:
generating respective outbound-voice-packet authentication tags based on the first symmetric session key, the respective outbound-voice-packet headers, and the respective unencrypted outbound-voice-packet payloads; and
outputting the respective outbound-voice-packet authentication tags to the communications interface for assembly with the respective outbound-voice-packet headers and the respective twice-encrypted outbound-voice-packet payloads for transmission to the endpoint in connection with the secure voice session.

26. The communication device as claimed in claim 21, wherein the program instructions for generating once-encrypted outbound-voice-packet payloads and the program instructions for generating twice-encrypted outbound-voice-packet payloads utilize two different symmetric encryption algorithms.

* * * * *